United States Patent
Chung et al.

(10) Patent No.: US 7,495,499 B2
(45) Date of Patent: Feb. 24, 2009

(54) POWER TRANSISTOR CIRCUIT AND THE METHOD THEREOF

(75) Inventors: Chien Chuan Chung, Hsinchu (TW); Chu Yu Chu, Hsinchu (TW); Yu Min Sun, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 188 days.

(21) Appl. No.: 11/783,556

(22) Filed: Apr. 10, 2007

(65) Prior Publication Data

US 2008/0205099 A1     Aug. 28, 2008

(30) Foreign Application Priority Data

Feb. 27, 2007    (TW)  ............................... 96106618 A

(51) Int. Cl.
     *H03K 17/687*      (2006.01)
(52) U.S. Cl. ........................... 327/427; 327/81; 327/543
(58) Field of Classification Search .................. 327/77, 327/80, 81, 89, 387, 389, 427, 538, 541, 327/543
See application file for complete search history.

(56) References Cited

U.S. PATENT DOCUMENTS

| | | | | |
|---|---|---|---|---|
| 3,675,114 A | * | 7/1972 | Nercessian | ................... 323/269 |
| 4,480,201 A | * | 10/1984 | Jaeschke | ...................... 327/375 |
| 4,994,694 A | * | 2/1991 | Gross | .......................... 327/430 |
| 5,467,242 A | * | 11/1995 | Kiraly | ........................... 361/94 |
| 5,764,041 A | * | 6/1998 | Pulvirenti et al. | ........... 323/282 |
| 5,789,971 A | * | 8/1998 | Colletti et al. | ............... 327/541 |
| 6,215,338 B1 | * | 4/2001 | Gervasi et al. | ............... 327/108 |
| 6,573,693 B2 | * | 6/2003 | Okamoto | ..................... 323/273 |
| 2004/0164786 A1 | * | 8/2004 | Yamamoto et al. | .......... 327/427 |

* cited by examiner

*Primary Examiner*—Donovan Lincoln
*Assistant Examiner*—William Hernandez
(74) *Attorney, Agent, or Firm*—Oliff & Berridge, PLC

(57) ABSTRACT

The power transistor circuit with high-voltage endurance includes a first power transistor, a second power transistor and an enabling circuit. The first power transistor includes a first voltage endurance and a first inner resistance, while the second power transistor includes a second voltage endurance and a second inner resistance. The first voltage endurance and the first inner resistance are smaller than the second voltage endurance and the second inner resistance, respectively. The drain of the second power transistor is connected to the drain of the first power transistor and the enabling circuit. The enabling circuit enables the second power transistor first, and when the drain voltage of the first power transistor is smaller than the first endurance, the enabling circuit then enables the first power transistor.

16 Claims, 4 Drawing Sheets

POWER TRANSISTOR CIRCUIT AND THE METHOD THEREOF

BACKGROUND OF THE INVENTION

1. Field of the Invention

The present invention relates to a power transistor circuit and the method thereof, and more particularly, to a power transistor circuit that has a high voltage limit and a low inner resistance.

2. Description of the Related Art

FIG. 1 is a hint diagram of a prior art photoflash capacitor charger, where the inductor 12 in the first winding side has its voltage drop and current conductance controlled by a power transistor 11. The power transistor 11 acts as a switch. As far as the process of the double-diffused metal oxide semiconductor (DMOS) is concerned, it provides a low inner resistance, good conductance speed and lower power consumption. However, the power transistor made from the DMOS has a voltage limit of is only 30 volts, which does not satisfy the requirement of 40-volt voltage limit for the photoflash capacitor charger. In other words, the prior DMOS technique based on the BCD process suffers from a reliability issue when the output voltage is greater than 30 volts, let alone the high voltage of 40 volts.

Another prior method to solve this problem is to use a multi-chip module (MCM) package technique to pack two power transistors into a single package. However, the MCM method incurs other side effects. Because the DMOS power transistor based on the BCD process or the like has the disadvantage of a low voltage limit, it is necessary to develop another circuit design with a high voltage limit while remaining in the state of a low inner resistance.

SUMMARY OF THE INVENTION

The object of the present invention is to raise the voltage limit of the entire power transistor circuit to adapt to different applications. In addition, while raising the voltage limit, the present invention still stays in the state of low inner resistance without consuming too much power.

The power transistor circuit according to an embodiment of the present invention includes a first power transistor, a second power transistor and a start-up circuit. The first power transistor has a drain, a source and a gate. In addition, the first power transistor has a first voltage limit and a first inner resistance. The second power transistor has a drain, a source and a gate. In addition, the first power transistor has a second voltage limit and a second inner resistance, and the drain of the second power transistor connects to the drain of the first power transistor. The start-up circuit includes a comparator; the comparison voltage of the comparator corresponds to the first voltage limit; one input end of the comparator connects to the drain of the first power transistor; and the output end of the start-up circuit connects to the gate of the first power transistor. The first power transistor and the second power transistor are manufactured through different processes; the first voltage limit is smaller than the second voltage limit; the first inner resistance is smaller than the second inner resistance; and the conducting time of the first power transistor is later than that of the second power transistor.

The power transistor circuit, according to another embodiment of the present invention, includes a first power transistor, a second power transistor and a start-up circuit. The first power transistor has a drain, a source and a gate. In addition, the first power transistor has a first voltage limit and a first inner resistance. The second power transistor has a drain, a source and a gate. In addition, the second power transistor has a second voltage limit and a second inner resistance, and the drain of the second power transistor connects to the drain of the first power transistor, wherein the first voltage limit is smaller than the second voltage limit, and the first inner resistance is smaller than the second inner resistance. The start-up circuit has one input end connected to the drain of the first power transistor. The start-up circuit enables the second power transistor first, and then enables the first power transistor if the drain voltage of the first power transistor is smaller than the first voltage limit.

The method for using a power transistor circuit according to an embodiment of the present invention includes step (a) to step (d). In step (a), a first power transistor and a second power transistor are provided. The drain of the first power transistor connects to that of the second power transistor. The inner resistance of the first power transistor is smaller than that of the second power transistor, and the voltage limit of the first power transistor is smaller than that of the second power transistor. In step (b), the second power transistor is turned on to gradually decrease the drain voltage of the second power transistor. In step (c), the drain voltage is compared with the voltage limit of the first power transistor. In step (d), the first power transistor is turned on if the drain voltage of the first power transistor is smaller than the voltage limit of the first power transistor.

BRIEF DESCRIPTION OF THE DRAWINGS

The invention will be described according to the appended drawings in which.

PREFERRED EMBODIMENT OF THE PRESENT INVENTION

Figure 1:
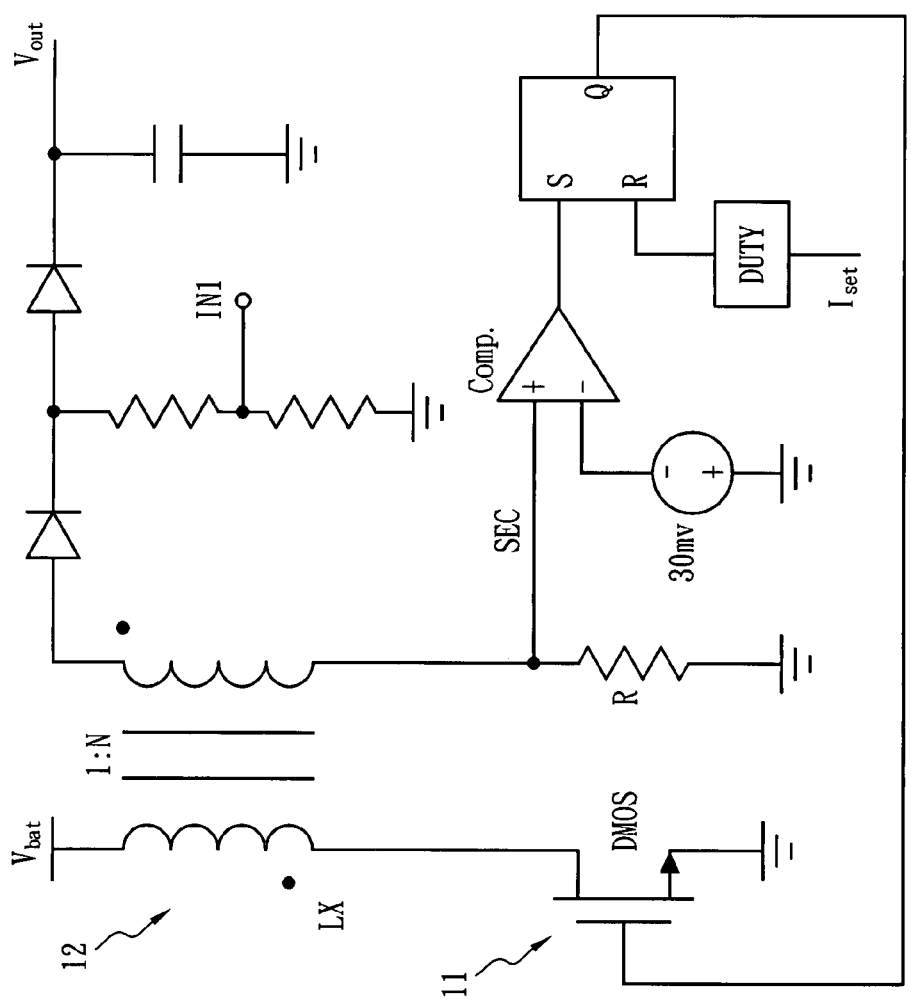
FIG. 1 is a hint diagram of a prior art photoflash capacitor charger.
Figure 2B:
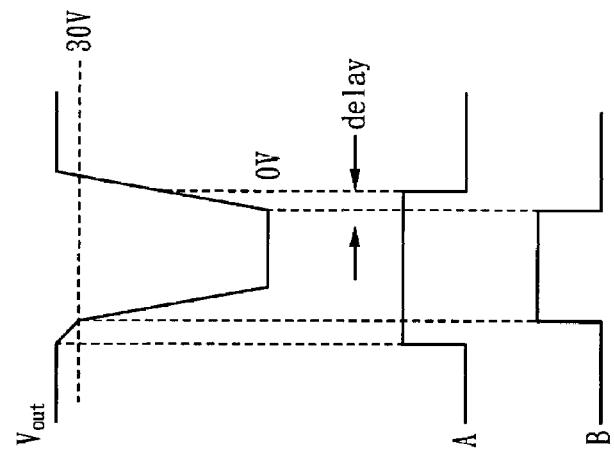
FIG. 2(b) is a timing diagram of FIG. 2(a)
Figure 2A:
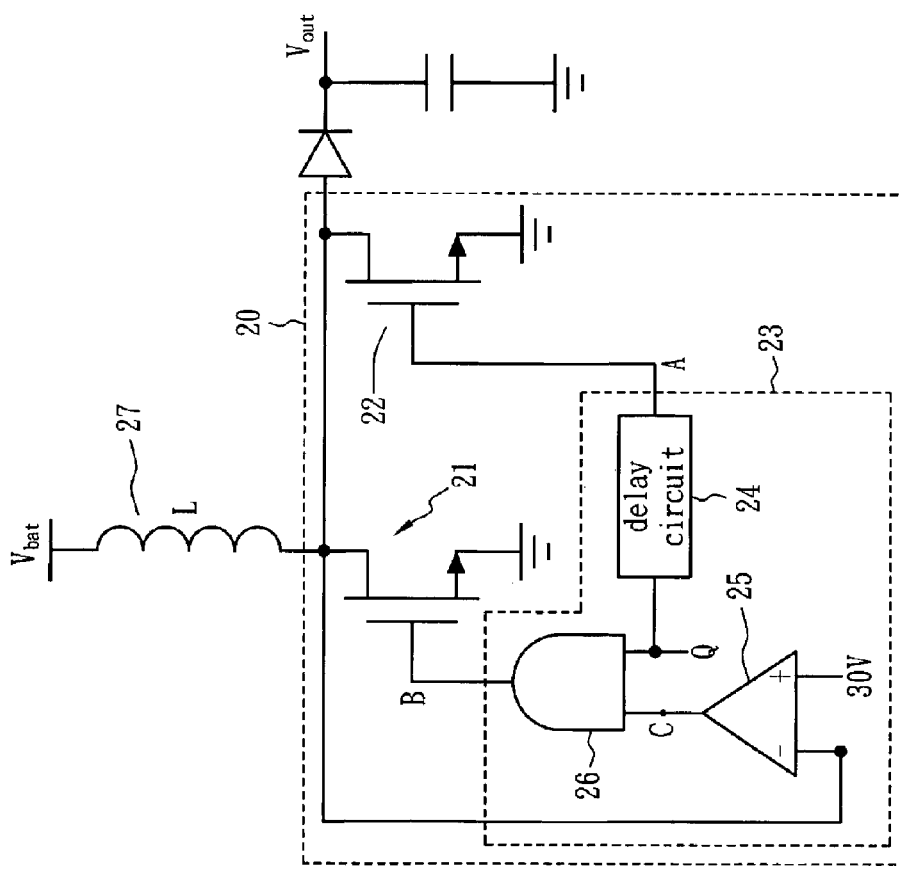
FIG. 2(a) depicts a power transistor circuit according to a first embodiment of the present invention.

FIG. 2(a) depicts a power transistor circuit according to one embodiment of the present invention. The power transistor circuit 20 includes a first power transistor 21, a second power transistor 22 and a start-up circuit 23. In this embodiment, the first power transistor 21 and the second power transistor 22 are manufactured through two different processes. The first power transistor 21 is a DMOS component, while the second power transistor 22 is a laterally diffused metal oxide semiconductor (LDMOS) component. The first power transistor 21 has a smaller voltage limit and inner resistance than the second power transistor 22. Table 1 lists the specification of the first power transistor 21 and the second power transistor 22, where the more elements connected in parallel there are, the smaller the inner resistance is, and the bigger the layout area is. Under the same inner resistance, the layout area of the LDMOS is five times that of the DMOS.

TABLE 1

| process | DMOS | LDMOS |
|---|---|---|
| scale | W = 20 µm, L = 1.6 µm | W = 20 µm, L = 3 µm |
| Number | 1400 | 900 |
| Inner resistance | 0.3 to 0.5 ohms | 40 ohms up |
| Voltage limit | 30 volts | 40 volts up |

The drain of the first power transistor 21 connects to that of the second power transistor 22 first, and then is coupled to a conductor 27. The start-up circuit 23 includes a comparator 25, an AND gate 26 and a delay circuit 24. The comparison voltage of the comparator 25 corresponds to the voltage limit of the first power transistor 21, which is 30 volts in Table 1. The input end of the comparator 25 electrically connects to the drain of the first power transistor 21. When the drain voltage of the first power transistor 21 is greater than 30 volts, the comparator 25 outputs a low voltage. Relatively, when the drain voltage of the first power transistor 21 is smaller than 30 volts, the comparator 25 outputs a high voltage. The start-up signal Q comes from the feedback of the second winding side as shown in FIG. 3.

Please refer to FIG. 2(b): when both of the first power transistor 21 and second power transistor 22 are disabled, $V_{out}$ is almost equal to the drain voltage of the first power transistor 21 or $V_{bat}$, which is a high voltage of 30 volts. A start-up signal Q first enables the second power transistor 22 through the delay circuit 24. Because the second power transistor 22 forms a conductive path with the inductor 27, $V_{out}$ gradually decreases. However, because the inner resistance of the second power transistor 22 is bigger than that of the first power transistor 21, the speed of voltage drop is slow. When $V_{out}$ falls under 30 volts, the comparator 25 outputs a high voltage. In the meantime, the AND gate 26 outputs a high voltage, and further enables the first power transistor 21. Because the inner resistance of the first power transistor 21 is smaller, the voltage drop is faster. When the voltage is increased, the first power transistor 21 is turned off first, and after a period of time the second power transistor 22 is turned off next. In this embodiment, the clock pulse is 2 µs, and the delay time is 20 ns, about 1% of the clock pulse. To save power, it is not suitable to maintain a long delay time. As far as the start-up circuit 23 of the present invention is concerned, the delay circuit 24 is optional. While the comparator 25 and the AND gate 26 can be replaced by other logic circuits, all alternative circuits having the same effect of the present invention is covered by the claims of the present invention.

Figure 3:
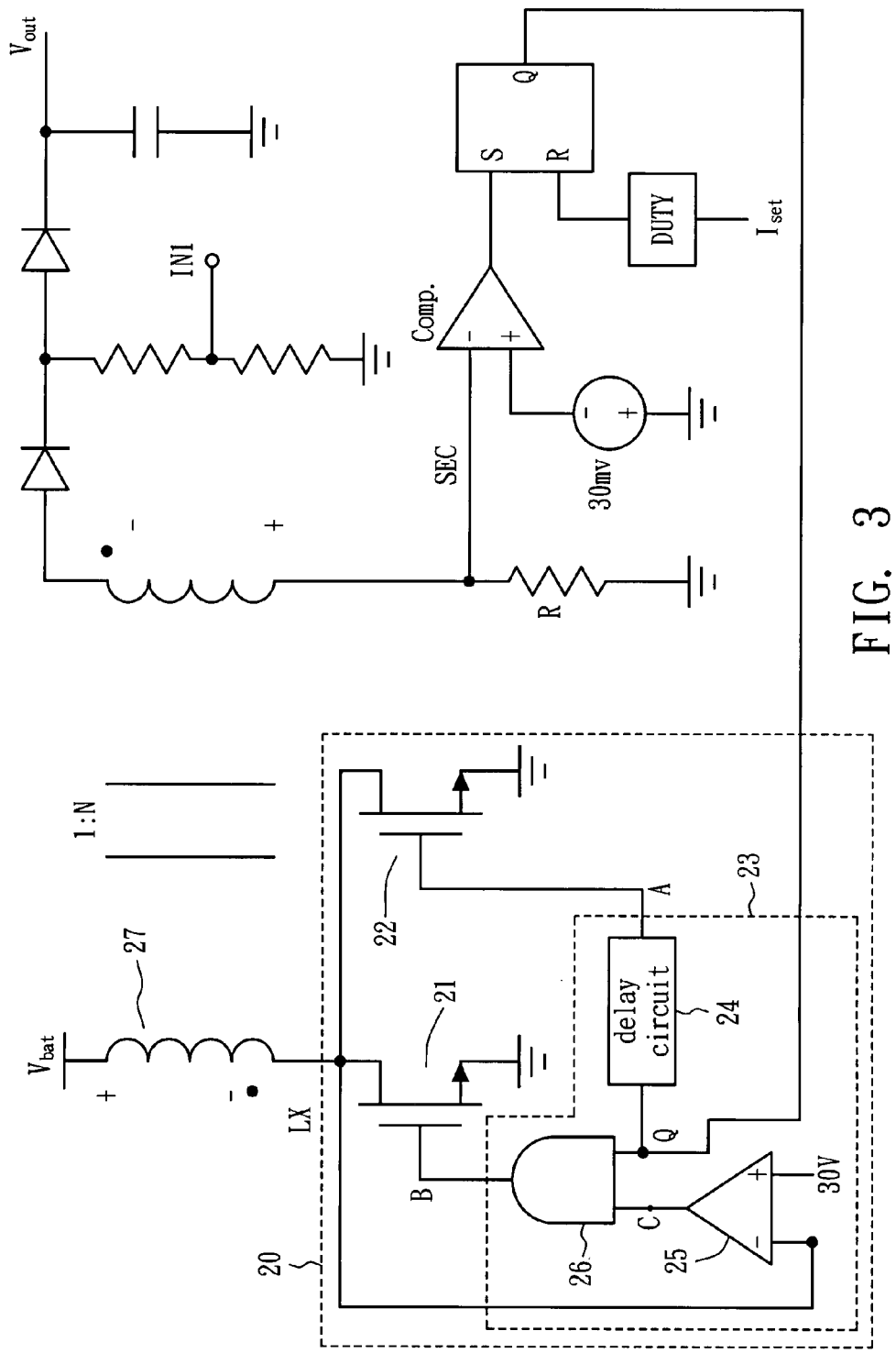
FIG. 3 shows an application in the photoflash capacitor charger of the first embodiment.
Figures 4A, 4B:
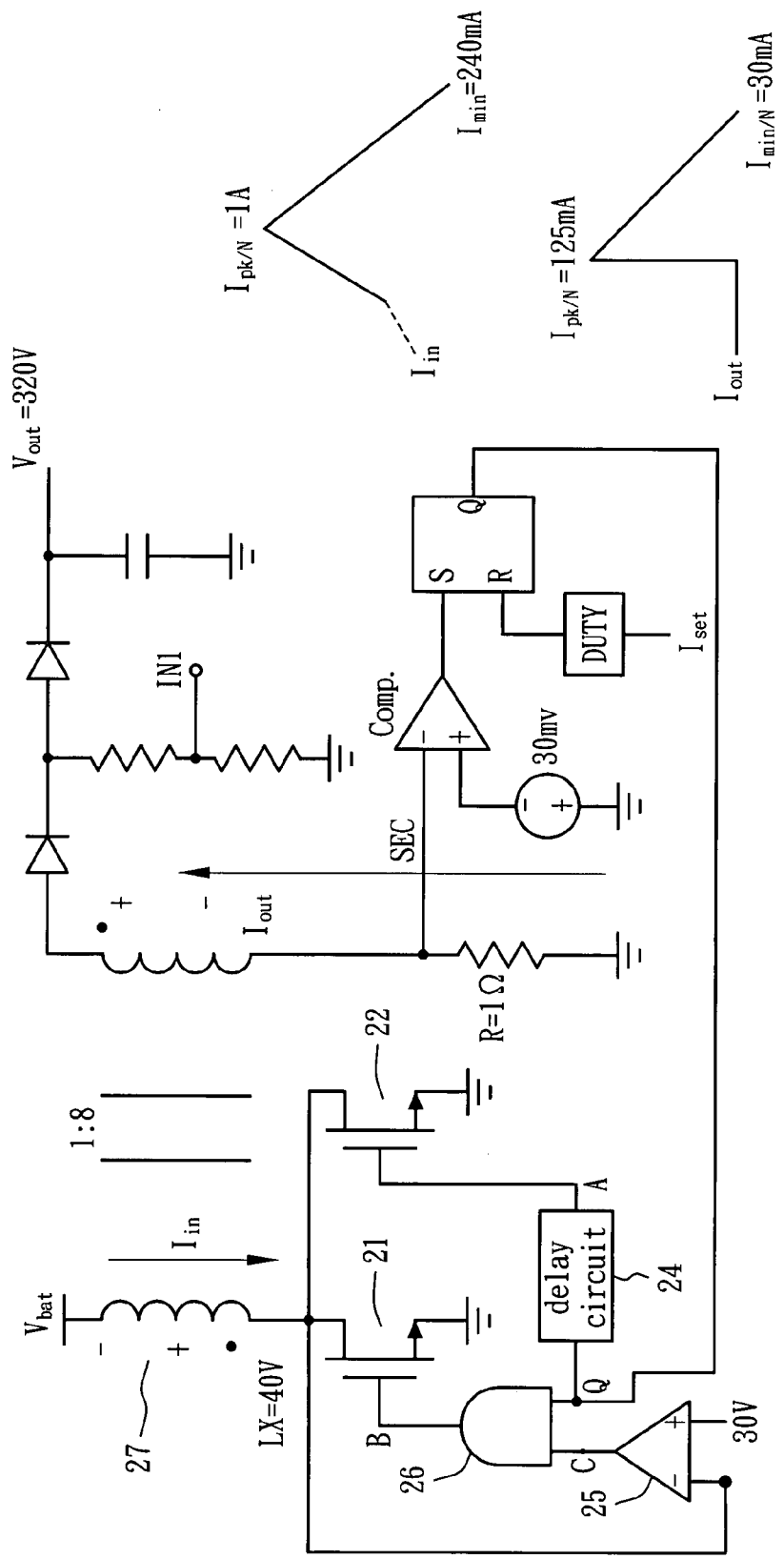
FIG. 4(a) shows an embodiment applied in the photoflash capacitor charger.
FIG. 4(b) shows a current wave of FIG. 4(a).

FIG. 3 shows an application in photoflash capacitor charger of the first embodiment. FIGS. 4(a) and 4(b) further display its circuit operation and current waves.

The present invention simultaneously uses low inner resistance of the first transistor 21 and the high voltage limit of the second power transistor 22. When the drain voltage of the first power transistor 21 is greater than 30 volts, the second power transistor 22 is turned on first, thus dropping the voltage under 30 volts. When the voltage is beneath 30 volts, the first power transistor 21 is turned on to fast lower the voltage. And at the same time the first power transistor 21 operates under its voltage limit in a safe manner. In addition, because the second power transistor 22 is for the purpose of dropping voltage down to 30 volts, it is not necessary to offer a large area for the second power transistor 22. Such a property is useful for manufacturing the first power transistor 21 and the second power transistor 22 into a single chip.

The above-described embodiments of the present invention are intended to be illustrative only. Numerous alternative embodiments may be devised by persons skilled in the art without departing from the scope of the following claims.

What is claimed is:

1. A power transistor circuit, comprising:
   a first power transistor having a drain, a source and a gate, wherein the first power transistor has a first voltage limit and a first inner resistance;
   a second power transistor having a drain, a source and a gate, wherein the first power transistor has a second voltage limit and a second inner resistance, and the drain of the second power transistor connects to the drain of the first power transistor;
   a start-up circuit including a comparator, the comparison voltage of the comparator corresponding to the first voltage limit, one input end of the comparator connected to the drain of the first power transistor, and the output end of the start-up circuit connected to the gate of the first power transistor;
   wherein the first power transistor and the second power transistor are manufactured by different processes, the first voltage limit is smaller than the second voltage limit, the first inner resistance is smaller than the second inner resistance, and the conducting time of the first power transistor is later than that of the second power transistor.

2. The power transistor circuit of claim 1, wherein the first power transistor is made by the process of double-diffused metal oxide semiconductor (DMOS).

3. The power transistor circuit of claim 1, wherein the second power transistor is made by the process of laterally diffused metal oxide semiconductor (LDMOS).

4. The power transistor circuit of claim 1, wherein the start-up circuit further comprises a delay circuit connected to the gate of the second power transistor.

5. The power transistor circuit of claim 4, wherein the start-up circuit further comprises an AND gate, wherein one input end of the AND gate connects to the output of the comparator, and the output of the AND gate connects to the gate of the first power transistor.

6. The power transistor circuit of claim 5, further comprising a start-up signal connected to the other input end of the AND gate and the delay circuit.

7. A power transistor circuit, comprising:
   a first power transistor having a drain, a source and a gate, wherein the first power transistor has a first voltage limit and a first inner resistance;
   a second power transistor having a drain, a source and a gate, wherein the second power transistor has a second voltage limit and a second inner resistance, and the drain of the second power transistor connects to the drain of the first power transistor, wherein the first voltage limit is smaller than the second voltage limit, and the first inner resistance is smaller than the second inner resistance; and
   a start-up circuit having one input end connected to the drain of the first power transistor, wherein the start-up circuit enables the second power transistor first, and then enables the first power transistor if the drain voltage of the first power transistor is smaller than the first voltage limit.

8. The power transistor circuit of claim 7, wherein the first power transistor is made by a DMOS process.

9. The power transistor circuit of claim 7, wherein the second power transistor is made by an LDMOS process.

10. The power transistor circuit of claim 7, wherein the start-up circuit further comprises a delay circuit connected to the gate of the second power transistor.

11. The power transistor circuit of claim 7, wherein the start-up circuit further comprises a comparator, the comparison voltage of the comparator corresponding to the first voltage limit, one input end of the comparator connected to the drain of the first power transistor.

12. The power transistor circuit of claim 11, wherein the start-up circuit further comprises an AND gate, wherein one input end of the AND gate connects to the comparator, and the output of the AND gate connects to the gate of the first power transistor.

13. A method for using a power transistor circuit, comprising the steps of:

provide a first power transistor and a second power transistor, the drain of the first power transistor connecting to that of the second power transistor, wherein the inner resistance of the first power transistor is smaller than that of the second power transistor, and the voltage limit of the first power transistor is smaller than that of the second power transistor;

enabling the second power transistor for gradually decreasing the drain voltage of the second power transistor;

comparing the drain voltage with the voltage limit of the first power transistor; and enabling the first power transistor if the drain voltage of the first power transistor is smaller than the voltage limit of the first power transistor.

14. The method of claim 13, further comprising the steps of:

disabling the first power transistor; and disabling the second power transistor after a period of time following disabling of the first power transistor.

15. The method of claim 13, wherein the first power transistor is made by a DMOS process.

16. The method of claim 13, wherein the second power transistor is made by an LDMOS process.

* * * * *